US010933346B2

(12) United States Patent
Minney

(10) Patent No.: US 10,933,346 B2
(45) Date of Patent: Mar. 2, 2021

(54) SOLAR WATER DISTILLATION MODULE

(71) Applicants: MAXIM ELECTRICAL SERVICES (VIC) PTY LTD, Victoria (AU); Mark Dawson, Victoria (AU)

(72) Inventor: Robert Minney, Victoria (AU)

(73) Assignees: MAXIM ELECTRICAL SERVICES (VIC) PTY LTD, Victoria (AU); Mark Dawson, Victoria (AU)

(*) Notice: Subject to any disclaimer, the term of this patent is extended or adjusted under 35 U.S.C. 154(b) by 0 days.

(21) Appl. No.: 16/489,125

(22) PCT Filed: Oct. 20, 2017

(86) PCT No.: PCT/AU2017/051147
§ 371 (c)(1),
(2) Date: Aug. 27, 2019

(87) PCT Pub. No.: WO2018/152565
PCT Pub. Date: Aug. 30, 2018

(65) Prior Publication Data
US 2020/0016507 A1 Jan. 16, 2020

(30) Foreign Application Priority Data

Feb. 27, 2017 (AU) .............................. 2017900657
Jun. 16, 2017 (AU) .............................. 2017902315

(51) Int. Cl.
*B01D 5/00* (2006.01)
*C02F 1/14* (2006.01)
(Continued)

(52) U.S. Cl.
CPC ............ *B01D 5/009* (2013.01); *B01D 1/0035* (2013.01); *B01D 1/22* (2013.01); *B01D 5/006* (2013.01);
(Continued)

(58) Field of Classification Search
CPC ...... B01D 1/0035; B01D 1/22; B01D 5/0015; B01D 5/006; B01D 5/009; C02F 1/14;
(Continued)

(56) References Cited

U.S. PATENT DOCUMENTS 2,405,877 A    8/1946 Delano
3,863,959 A *  2/1975 Blaschke .............. E21B 17/046
                                         285/24
(Continued)

OTHER PUBLICATIONS

Chotiner (Build a North Woods Retreat, Popular Mechanics, Dec. 1983) (Year: 1983).*
(Continued)

*Primary Examiner* — Jonathan Miller
*Assistant Examiner* — Gabriel E Gitman
(74) *Attorney, Agent, or Firm* — Maier & Maier, PLLC

(57) ABSTRACT

An improved solar water distillation system including: a flow system for collecting one or more condensate streams from an input treatment liquid; and an input treatment liquid separator within the flow system adapted to collect excess input treatment liquid from the flow system separate from the one or more condensate streams. The treatment liquid is maintained separate to the condensate streams to substantially minimise cross-contamination of the one or more condensate streams.

11 Claims, 9 Drawing Sheets

(51) Int. Cl.
*B01D 1/00* (2006.01)
*B01D 1/22* (2006.01)
*C02F 103/08* (2006.01)

(52) U.S. Cl.
CPC .............. *B01D 5/0015* (2013.01); *C02F 1/14* (2013.01); *C02F 2103/08* (2013.01)

(58) Field of Classification Search
CPC .. C02F 2103/08; Y02A 20/128; Y02A 20/212
See application file for complete search history.

(56) References Cited

U.S. PATENT DOCUMENTS

| | | | | |
|---|---|---|---|---|
| 2002/0060147 A1* | 5/2002 | Ludwig | ................ | B01D 5/0066 203/10 |
| 2008/0290123 A1* | 11/2008 | Sprague | ................. | B60R 9/045 224/321 |
| 2011/0139601 A1* | 6/2011 | Johnstone | .............. | B01D 1/221 202/180 |
| 2014/0124356 A1* | 5/2014 | Mueller | ................. | F24S 60/30 203/10 |

OTHER PUBLICATIONS

Janarthanan, B., Chandrasekaran, J., & Kumar, S. (2006). Performance of floating cum tilted-wick type solar still with the effect of water flowing over the glass cover. Desalination, 190(1-3), 51-62. (Year: 2006).*

Mashaly, A. F., Alazba, A. A., Al-Awaadh, A. M., & Mattar, M. A. (2015). Area determination of solar desalination system for irrigating crops in greenhouses using different quality feed water. Agricultural Water Management, 154, 1-10. (Year: 2015).*

International Search Report and Written Opinion of the International Searching Authority dated Jan. 18, 2018 in corresponding International application No. PCT/AU2017/051147; 13 pages.

Mashaly, et al., "Area determination of solar desalination system for irrigating crops in greenhouses using different quality feed water", Agricultural Water Management, 2015, vol. 154, p. 1-10; 10 pages.

* cited by examiner

SOLAR WATER DISTILLATION MODULE

CROSS REFERENCE TO RELATED APPLICATIONS

This patent application is a continuation of International Application no. PCT/AU2017/051147 filed on 20 Oct. 2017, which claims the benefit of AU Provisional application No's 2017900657 filed on 27 Feb. 2017 and 2017902315 filed on 16 Jun. 2017.

FIELD

The present invention relates to an improved solar water distillation module for substantially purifying a treatment liquid supply stream and reducing contamination between source liquid and condensate.

In particular, the present invention relates to an improved solar water distillation module effective to provide a fresh water source from a saline, brackish or otherwise contaminate supply.

The invention has been developed primarily for use in/with an improved solar water distillation module, and will be described hereinafter with reference to this application. However, it will be appreciated that the invention is not limited to this particular field of use.

BACKGROUND

The capability of providing enough clean or fresh water for a variety of purposes including providing drinking water, and for irrigating crops without salt build up in land structures commonly associated with use of artesian water, is becoming an increasing problem for the planet. This is particularly the case for relatively dry and arid areas such as Australia, but is also a problem for many other areas of the world.

There have been a number of proposals for solar stills, however, they generally are all characterized by being expensive to produce and use relative to the quantity of fresh clean water produced. Some attempts have been made to address this problem, however there are still drawbacks associated with cross-contamination meaning condensed water has mixed or been caused to come into contact and therefore mix with contaminated treatment liquid. This defeats the fundamental purpose of obtaining a fresh supply of water.

Existing solar stills have also suffered from corrosion and general inefficiencies caused by blockages or barriers to disburse flows either fully, partially or evenly within a solar still module therefore minimising or eliminating the opportunity for an input treatment liquid to evaporate and form a condensate within a still.

In view of the above, it is desirable to have an improved solar still module that addresses and ameliorates at least one or more of the prior art deficiencies or at least provides a practical variation to avert from one of more of the prior art deficiencies.

It is to be understood that, if any prior art information is referred to herein, such reference does not constitute an admission that the information forms part of the common general knowledge in the art, in Australia or any other country.

SUMMARY

In a related aspect of the present invention there is further described an improved solar water distillation system including:
a flow system for collecting one or more condensate streams from an input treatment liquid; and
an input treatment liquid separator within the flow system adapted to collect excess input treatment liquid from the flow system separate from the one or more condensate streams;
wherein the treatment liquid is maintained separate to the condensate streams to substantially minimise cross-contamination of the one or more condensate streams.

The improved solar water distillation module provides distinct separation of an input liquid treatment supply stream and multiple condensate (distilled water) streams formed within the module. The specific construction features of the module substantially reduce the possibility of cross-contamination of the condensate streams and treatment liquid, and increases the distillation quality and efficiency.

Preferably the flow system comprises an elongate planar frame assembly defining a perimeter having a top end and a bottom end, and leg supports supporting the frame assembly at an angle to the horizontal to allow gravitational flow of input treatment liquid and condensate streams; a disbursement header mounted to the elongate planar frame assembly located close to the top end, the disbursement header having a reservoir for receiving treatment liquid from a treatment liquid source; an elongate base tray mounted to the planar frame assembly having a planar upper surface and opposite facing surface, wherein the upper surface is heat conductive and adapted to reflect solar energy; a porous material sheet overlaying the planar upper surface of the base tray, wherein a portion of the porous material is in fluid communication with the reservoir of the disbursement header, and wherein the porous material sheet is adapted to draw liquid from the reservoir of treatment liquid and distribute the treatment liquid over the area defined by the upper surface of the base tray; an upper solar energy transmission wall attached to the planar frame extending over and spaced from the upper surface of the elongate base tray, the upper solar energy transmission wall having an inner condensate surface being hydrophilic relative to the condensate, whereby the inner surface provides a pathway for a first condensate stream; and a lower transmission wall attached to the planar frame extending over and spaced from the lower surface of the elongate base tray, the lower solar energy transmission wall having an inner condensate surface, whereby the inner surface of the lower transmission wall provides a pathway for a second condensate stream.

Preferably the input treatment liquid separator comprises a base tray receiving member having: a body adapted to be mounted at or close to the bottom end of the frame assembly extending between side portions of the frame assembly; at least one mounting attachment on the body adapted to be mounted by a mounting portion on the frame assembly adjacent the bottom end; an internal trough within the body receiving a bottom end portion of the base tray and the porous material sheet therethrough in an assembled condition, wherein excess treatment liquid expelled from the bottom end of the porous material sheet is received by the internal trough; and an outlet in the internal trough for directing expelled treatment fluid collected in the internal trough out of the module, separate from the condensate streams; wherein the one or more mounting attachments of the base tray receiving member and the frame assembly cooperate to form a well separate from and offset to the internal trough to collect condensate from the plurality of condensation streams substantially without cross-contamination with the treatment liquid; and wherein the frame assembly includes a condensate outlet located in a bottom end portion thereof in communication with the well, whereby the orientation of the frame assembly directs flow of condensate in the well to the condensate outlet for collection separate from the treatment liquid.

In a related aspect of the present invention, there is provided an improved solar water distillation module substantially minimising cross-contamination of an input stream of a treatment liquid and a plurality of condensate streams, including:

a. an elongate planar frame assembly defining a perimeter having a top end and a bottom end and side portions, and leg supports supporting the frame assembly at an angle to the horizontal defining a top end and a bottom end thereof, and at an angle to the vertical;

b. a disbursement header mounted to the planar frame assembly located close to the top end, the disbursement header having a reservoir for receiving treatment liquid from a treatment liquid source;

c. an elongate base tray mounted to the planar frame assembly having a planar upper surface and opposite facing surface, wherein the upper surface is heat conductive and adapted to reflect solar energy;

d. a porous material sheet overlaying the planar upper surface of the base tray, wherein a top end portion of the porous material is in fluid communication with the reservoir of the disbursement header, and wherein the porous material sheet is adapted to draw liquid from the reservoir of treatment liquid and distribute the treatment liquid over the area defined by the upper surface of the base tray;

e. an upper solar energy transmission wall attached to the planar frame extending over and spaced from the upper surface of the elongate base tray, the upper solar energy transmission wall formed of substantially clear or translucent plastic material having an inner condensate surface being hydrophilic relative to the condensate, whereby the inner surface provides a pathway for a first condensate stream;

f. a lower transmission wall attached to the planar frame extending over and spaced from the lower surface of the elongate base tray, the lower solar energy transmission wall having an inner condensate surface, whereby the inner surface of the lower transmission wall provides a pathway for a second condensate stream;

g. a base tray receiving member having:

i. a body adapted to be mounted at or close to the bottom end of the frame assembly extending between the side portions of the frame assembly;

ii. at least one mounting attachment on the body adapted to be mounted by a mounting portion on the frame assembly adjacent the bottom end;

iii. an internal trough within the body having a ceiling, an opposite floor, a throat, and a mouth, the internal trough facing away from the mounting attachment, wherein the mouth receives a bottom end portion of the base tray and the porous material sheet therethrough in an assembled condition, wherein excess treatment liquid expelled from the bottom end of the porous material sheet is received by the internal trough; and iv. an outlet in the throat for directing expelled treatment fluid collected in the internal trough out of the module, wherein in an assembled condition, the outlet extends through a bottom end portion of the frame assembly for egress of excess treatment liquid separate from the condensate streams;

v. wherein the at least one mounting attachment of the tray receiving member and the frame assembly cooperate to form a well separate from and offset to the internal trough to collect condensate from the plurality of condensation streams substantially without cross-contamination with the treatment liquid; and h. wherein the frame assembly includes a condensate outlet located in a bottom end portion thereof in communication with the well, whereby the orientation of the frame assembly directs flow of condensate in the well to the condensate outlet for collection separate from the treatment liquid.

Multiple condensate streams are formed on at least (i) the inner surface of the upper transmission wall, (ii) the inner surface of the lower transmission wall, and (iii) lower surface of the base tray. The upper and lower solar energy transmission walls and base tray provide surfaces for forming multiple condensation streams within the module.

The improved solar water distillation module can further include an inner plastic sheet covering at least a portion of the upper surface of the base tray and sandwiched between the base tray and the porous material sheet. The inner plastic sheet can be a clear or translucent polymer. The clear or translucent polymer can be acid etched on its surface or coated with silicon oxide, aluminium oxide, or titanium oxide.

This inner plastic layer improves resistance to corrosion of the tray surface by treatment liquid. This also means that there is less frequent need to replace the tray. The base tray can be made from anti-corrosive treated aluminium or steel or stainless-steel material.

The porous material layer can be selected from natural fibre materials such as wool, propylene, polyester and polyester blended materials. The porous material sheet can be adhered to the plastic inner sheet by means of a sealant, glue, tape or other suitable means.

The module can include a series of spaced apart horizontally extending braces. The braces can be fitted at their ends to the frame assembly to retain them in position over and against the porous sheet material to substantially maintain the porous material sheet in a static position. The braces can further include a series of spaced apart recesses for receiving a longitudinal spacer member. The module can include a series of longitudinal spacer members extending between the top and bottom end of the frame assembly received in recesses of the spaced apart horizontally extending braces. The module can also include one or more stiffening cross-braces mounted to the frame assembly extending beneath the base tray.

Each of the longitudinal spacer members are preferably inverted v-shaped in cross-section forming longitudinal ribs slotting into the spaced recesses of the horizontal braces. The ribs can support the upper plastic sheet in a spaced location relative to the porous material sheet. Preferably the spacing between the upper plastic sheet and porous material layer is between about 10 to 40 mm.

The one or more mounting attachment(s) on the body of the tray receiving member can include spaced tabs or flanges extending rearwardly from the body towards the bottom end that engage within a recess in the bottom end of the frame assembly.

Preferably the bottom end of the frame assembly includes a recess for receiving the one or more mounting attachments of the base tray receiving member to allow mounting of the base tray receiving member close to the bottom end of the frame assembly. In one embodiment the bottom end of the frame assembly can include a recess for receiving the each mounting attachment of the tray receiving member.

Preferably the base tray receiving member includes a conduit integral to the body and coinciding with the outlet in the throat portion of the internal trough, wherein in an assembled condition the conduit extends through an opening in the bottom end of the frame assembly for egress or recycling of the input treatment liquid.

The longitudinal ribs and mounting attachments on the body of the tray receiving member can include mating engagement components. The mating engagement components can include:

a. a central prong on an end portion of a longitudinal rib, and
b. a series of complementary ridge portions on a top surface of the body coextending with and oppositely to the mounting attachment(s).

In a preferred aspect, the longitudinal ribs can include a central prong overhanging a pair of offset insert spacers at a bottom end portion thereof, wherein in assembly the central prong is adapted to engage with a ridge portion on the body of the tray receiving member, and wherein the offset insert spacers slot within the mouth of the internal trough engaging the ceiling and floor of the internal trough. This assembly has several advantages including reinforcing the strength of the cross-brace structure, and maintaining the mouth of the internal trough in an open condition at a predetermined width.

In one embodiment, the internal trough of the tray receiving member can be u-shaped and oriented within the confines of the upper and lower solar energy transmission walls in substantial alignment with the angle of the frame assembly. The trough can include a mouth or slit extending across the frame assembly through which the base tray and porous material thereon is received. In an assembled condition, a lower end portion of the base tray extends through the mouth into the internal trough, wherein the lower surface of the base tray can be attached to the floor of the internal trough by means of adhesive, sealant, glue, tape or the like.

This sealing arrangement substantially prevents treatment liquid from escaping the mouth between the underneath/lower surface of the base tray and the floor of the internal trough, and otherwise consequent mixing with condensate streams on a lower surface of the base tray and/or inner surface of the lower solar transmission wall. Further, the sealing arrangement of the base tray with the floor of the internal trough substantially minimises treatment liquid being exposed to and reacting with the lower end surface portions of the base tray and corroding the base tray.

The mounting attachments on the base tray receiving member can include a series of spaced apart mounting flanges or location tabs mounted on the body extending rearwardly therefrom adapted to engage with a recess portion of the bottom end frame assembly.

Preferably spaced apart the mounting flanges include a recess therebetween such that in a mounted position with the recess portion in the bottom end of the frame assembly, a well is formed separate from and offset to the internal trough for receiving the multiple condensate streams substantially without cross-contamination with the treatment liquid.

The frame assembly can include a condensate outlet located in a bottom end of the frame assembly in communication with the well, formed by the bottom end of the frame assembly and the mounting attachments, whereby the orientation of the frame assembly to the horizontal and vertical promotes egress of the condensate from the well to the outlet.

The internal trough of the tray receiving member can further include a series of spacer elements or teeth therewithin adapted to assist (a) maintain the mouth of the internal trough in an open condition at a predetermined width, (b) contact with the base tray, porous material sheet and plastic inner sheet, (c) reduce blockages from the input water which could cause cross-contamination or reduce output efficiency.

The plastic sheet forming the upper solar energy transmission wall can be made from a preformed flexible polymer material. The polymer can be selected from polycarbonate, polyester, PET, polypropylene, polyethylene, acrylic or acetyl.

The upper solar energy transmission wall can include a layer of hydrophilic material on the inner surface thereof. The hydrophilic layer can be formed by mechanical means such as acid etching the inner surface of the polymer material forming the upper sheet, or by applying a coating or layer to the inner surface such as an oxide layer. This allows the condensate to preferentially bead on the inner surface and flow gravitationally downwardly with the gradient of the frame assembly in constant contact with the hydrophilic inner surface.

In an operating condition, treatment liquid such as saline or salt loaded water such as sea water, is fed into the header unit and the liquid is dispersed over the base tray by the porous material exposing the liquid to solar energy passing through the upper solar energy transmission wall and/or reflected from the base tray. Consequently, the treatment liquid evaporates from the porous material and condenses on at least (i) the inner surface of the upper plastic sheet, (ii) the inner surface of the lower transmission wall, and (iii) lower surface of the base tray.

Excess treatment liquid accumulating at the bottom end of the porous material is collected in the internal trough in the tray receiving structure, and exits the module via an outlet in a throat portion of the trough. The structure of the trough and interrelationship between the internal trough and base tray received therein, substantially reduces cross-contamination of separate condensate flow pathways.

The improved solar water distillation module can further include a rain collection gutter mounted to the bottom end of the frame assembly so that rain contacting the external surface of the upper solar energy transmission wall can run downwardly on the outside of the module to be collected by the gutter. The gutter can include a rain water collection device. In one embodiment, the invention can include a plurality of solar still modules connected in series.

In a further related aspect of the present invention there is further described an improved solar water distillation module substantially minimising cross-contamination of an input stream of a treatment liquid and a plurality of condensate streams, including: an elongate support frame having an input end for ingress of a treatment liquid, and a distillate end for collection and egress of one or more condensate streams, wherein the support frame is supported at an incline to the horizontal for assisting liquid transfer of one or more condensate flows between the input end and distillate end; a liquid treatment chamber for treating the liquid supply stream, mounted on the frame and exposed to solar energy, including: a base tray having a floor portion and upwardly dependent walls, the floor portion having a solar energy reflective surface; a reservoir adapted to be mounted on a portion of the base tray at or near the input end of the frame adapted for receiving a supply of the treatment liquid; a substantially clear or translucent inner sheet on the floor of the base tray; a porous fabric layer overlaying at least part of the substantially clear or translucent inner sheet defining a liquid treatment path, and whereby one end of the porous layer is in fluid communication with the reservoir to draw liquid from the reservoir; an upper solar transmission sheet attached to the frame and being spaced from and overlaying the base tray, wherein the inside facing surface of the upper sheet is hydrophilic to allow condensation of vapor in a film over the hydrophilic surface; a lower sheet mounted to the frame extending beneath the base tray having an inner hydrophilic surface; a base tray receiving member mounted at the distillate end of the frame, the base tray receiving member having an internal trough and a rearward mounting end spaced from the internal trough, the rearward mounting end and frame assembly adapted to cooperate to form a well separate from and offset to the internal trough to collect condensate from the one or more condensation streams substantially without cross-contamination with treatment liquid having an internal trough; wherein a distillate end portion of the base tray extends into the trough so that multiple streams of condensate formed on the inner surface of the upper sheet, an upper surface of the lower sheet, and surface portion of the base tray opposite the floor, flow into the trough separately from the treatment liquid in the porous medium; and wherein the liquid supply evaporates within the treatment chamber in response to exposure to solar energy and condenses on the inner hydrophilic surface of the upper sheet, of the outer enclosure forming a condensate film layer thereover to promote improved rate of flow of condensate towards the trough, and substantially improving solar energy transmission.

This present invention substantially reduces the possibility of contamination of the condensate produced and increases the capacity and life in use of the solar water distillation module to produce by ensuring internal separation of the treatment liquid and the condensate and the continual input and disbursement of the treatment liquid.

The upper sheet of the outer enclosure can comprise an inner surface having a hydrophilic surface. Preferably the hydrophilic surface is formed by an oxide layer on the inner surface of the upper sheet.

The outer enclosure can include one or more ribs forming at least one elongate ridge extending along and between the lower and upper sheets, wherein the ridge divides the outer enclosure into at least two separated channels along which said treatment liquid can flow. The or at least one of the aforesaid ridge formations may engage an inner surface of the upper solar energy transmission wall. The treatment chamber may be defined by first upper wall following the solar energy transmission wall and a second lower wall, each of said first upper wall and said second lower wall being substantially spaced from said treatment member.

In an operating condition, the treatment liquid is substantially continuously supplied to the reservoir. An end portion of the porous fabric layer is in fluid communication with treatment liquid in the reservoir. The porous fabric layer acts as wicking agent and draws the treatment liquid therefrom and disperses the liquid over the liquid treatment pathway exposing the treatment liquid to solar energy passing through the upper sheet of the outer enclosure. On exposure to the solar energy, the treatment liquid evaporates from the porous fabric layer, and the vapour produced permeates the inner sheet and condenses on lower surfaces of the upper sheet.

The solar water distillation module can further include an input treatment liquid delivery mechanism which integrates with the porous material, where the porous material acts as wicking agent and thus disperses over the treatment liquid gravitationally down the inner treatment chamber.

The solar water distillation module can further include an integral pre-formed trough adapted to receive one or more condensate streams separately from the input treatment liquid.

The condensate will flow from the inside of the upper sheet, the rear surface of the treatment chamber base and the inner surface of the lower sheet into a sealed internal area created by the internal trough and the outer frame of the module. This design ensures the complete separation of the porous material containing the treatment liquid and the inner surface of the upper sheet, the rear surface of the treatment chamber base and the inner surface of the lower sheet.

The pre-formed internal trough will capture any input treatment liquid that does not evaporate and therefore has remained on or absorbed into the porous material and will exit the module via an integrated outlet pipe at the lower end of the internal trough.

Other aspects of the invention are also disclosed with reference to accompanying drawings and examples.

BRIEF DESCRIPTION OF THE DRAWINGS

Notwithstanding any other forms which may fall within the scope of the present invention, preferred embodiments of the invention will now be described, by way of example only, with reference to the accompanying drawings in which.

DETAILED DESCRIPTION OF THE EMBODIMENTS

Figure 1:
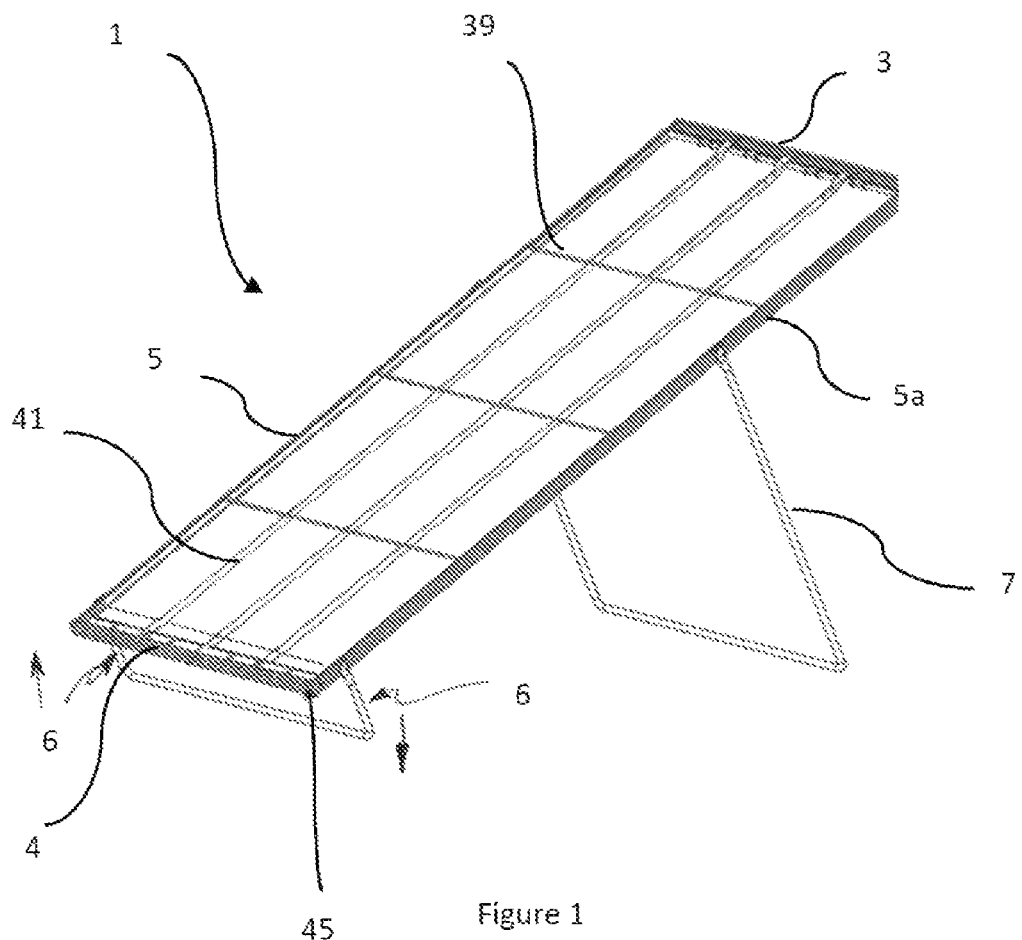
FIG. 1 is a schematic representation from side elevation of an improved solar still module in accordance with a preferred embodiment of the present invention.

It should be noted in the following description that like or the same reference numerals in different embodiments denote the same or similar features.

Referring to the drawings there is shown an improved solar water distillation module 1 comprising an elongate planar frame assembly 2 and a liquid treatment chamber 86 for treating the liquid supply stream, mounted on the frame and exposed to solar energy. The elongate planar frame assembly 2 is of general rectangular configuration formed by galvanised metal tubing or pipe or the like, defining a perimeter having a top end 3 and a bottom end 4 and longitudinal side portions 5 and 5a. The frame assembly 2 is shown supported by legs 6 and 7 at an angle to the horizontal to promote gravitational flow from top to bottom end, and an angle to the vertical to promote flows to one side of the frame assembly. The treatment chamber 86 is defined by a first upper solar energy transmission wall 15 and a second lower wall 17, each of the first upper wall and second lower wall being spaced from an intermediate treatment member 10.

The module 1 further includes a disbursement header 8 mounted on a support tray 22, which in turn is attached to the top frame and of the frame assembly, adjacent to the top end of the frame assembly. The disbursement header 8 includes a longitudinal opening 23 leading into a reservoir 9 which is in fluid communication with a source of treatment liquid such as salt water (not shown). In operation, a volume of the treatment liquid is received by the reservoir.

Figure 2:
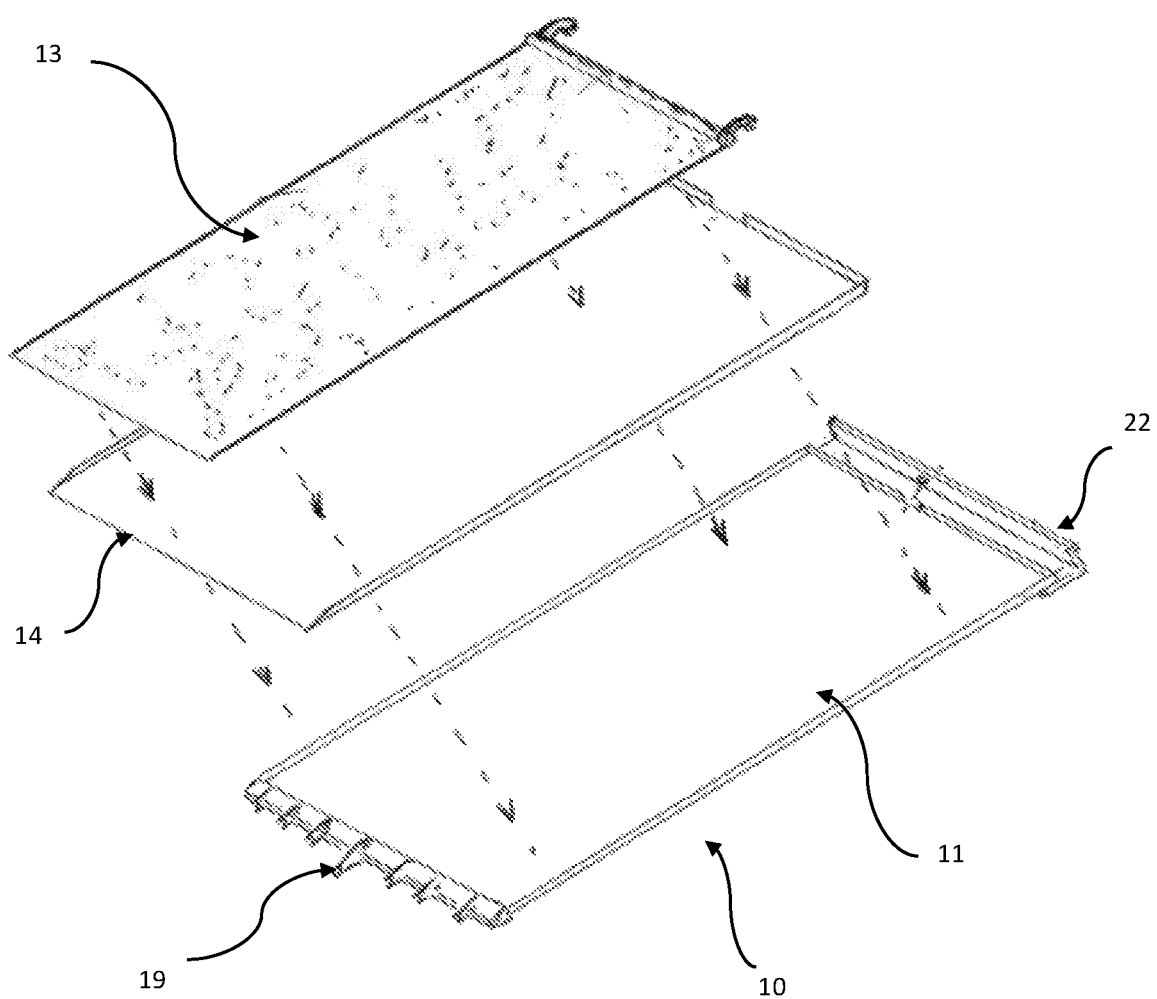
FIG. 2 is a schematic exploded representation of internal components of the module in FIG. 1.
Figure 3:
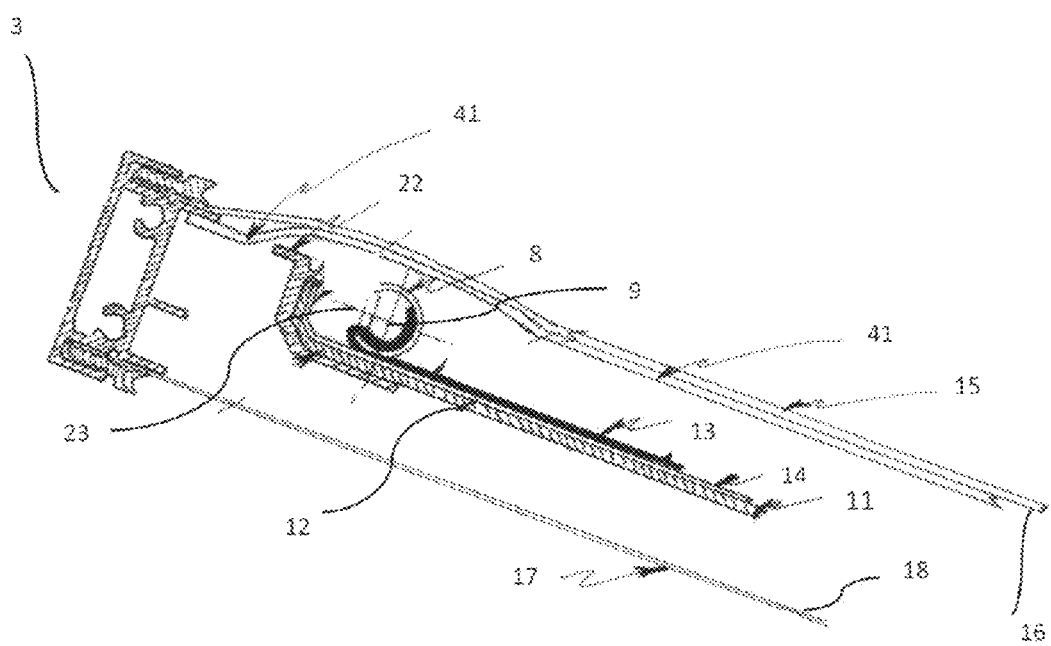
FIG. 3 is a schematic cross-sectional representation of a top end portion of the improved solar still module in FIG. 1.

The module further comprises an elongate base tray 11 mounted to and supported by the support tray 22 and/or frame assembly 2. The base tray made of a metal such as steel has a planar upper surface and opposite lower surface 12. The upper surface is anti-corrosive, heat conductive and adapted to reflect solar energy. As shown in FIG. 2, overlaying the upper surface of the base tray is a porous material sheet 13. As shown in FIG. 3, a top end portion of the porous material 13 is received through the opening 23 of the header 8 and resides in the reservoir 9. The porous sheet is made from natural fibre materials such as wool, propylene, polyester and polyester blended materials, which draws treatment liquid in the reservoir and distributes the treatment liquid 37 over the area defined by the upper surface of the base tray by capillary action.

In one embodiment (refer FIG. 2), the module includes an inner plastic 14 sandwiched between the base tray and the porous material sheet. The inner plastic sheet is a clear polymer material coated with silicon oxide, aluminium oxide, or titanium oxide.

The module further comprises an upper solar energy transmission wall 15 attached to the frame assembly 2 extending over and spaced from the upper surface 11 of the elongate base tray 11. The upper solar energy transmission wall is a preformed flexible polymer material selected from polycarbonate, polyester, PET, polypropylene, polyethylene, acrylic or acetyl. The upper solar energy transmission wall has an inner condensate surface 16 being hydrophilic relative to the condensate. This hydrophilic surface allows beading and provides a preferential surface for a condensate stream.

There is also shown a lower transmission wall 17 attached to the planar frame extending over and spaced beneath the lower surface 12 of the elongate base tray 11. In this embodiment, the lower solar energy transmission wall 17 comprises an inner condensate surface 18, which provides a second internal pathway for a condensate stream.

Figure 4:
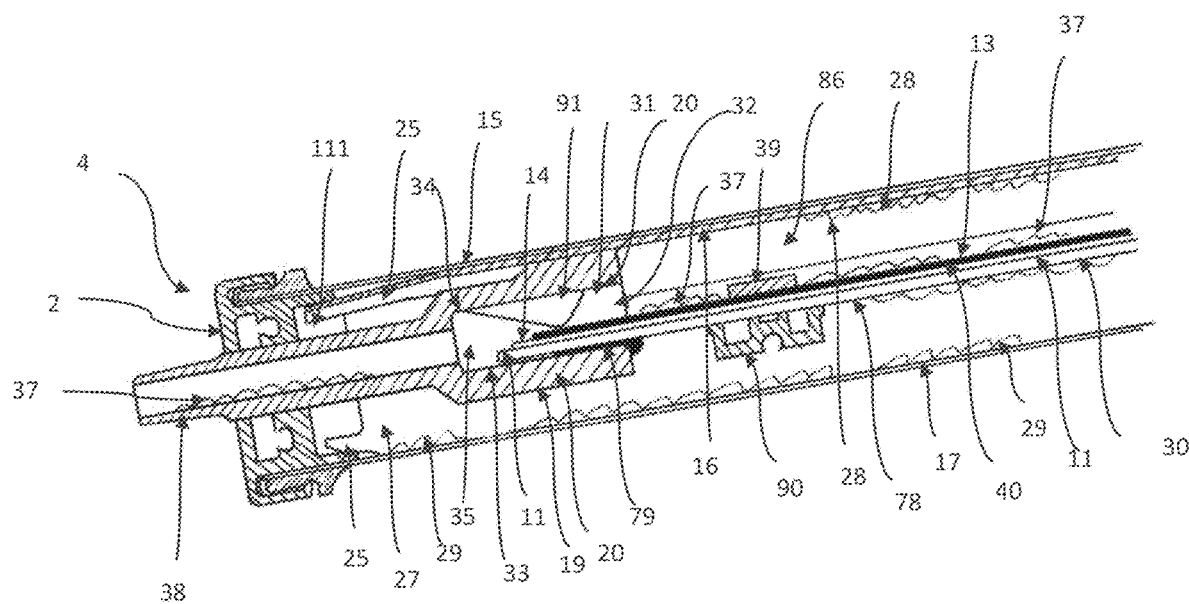
FIG. 4 is a schematic cross-sectional representation of a bottom end portion of the module in FIGS. 1 and 3 across line X-X'.
Figure 5:
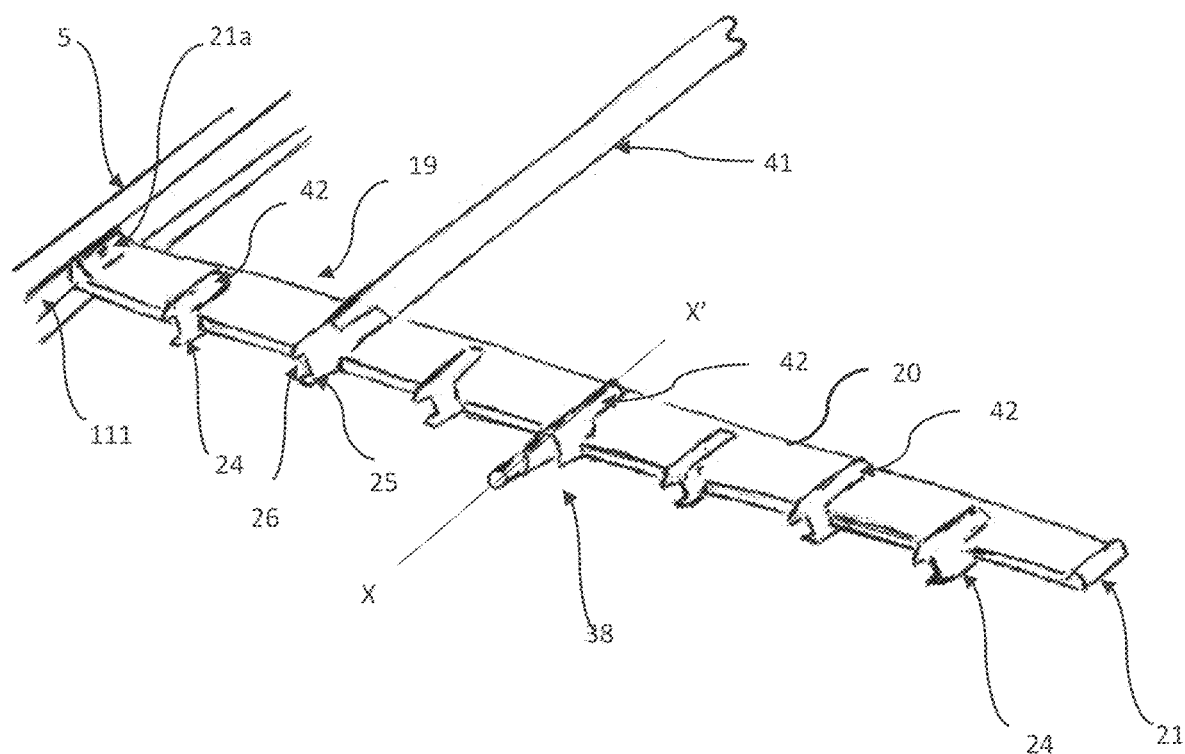
FIG. 5 is a schematic representation of a base tray receiving member of the module in accordance with a preferred embodiment of the present invention.
Figure 6:
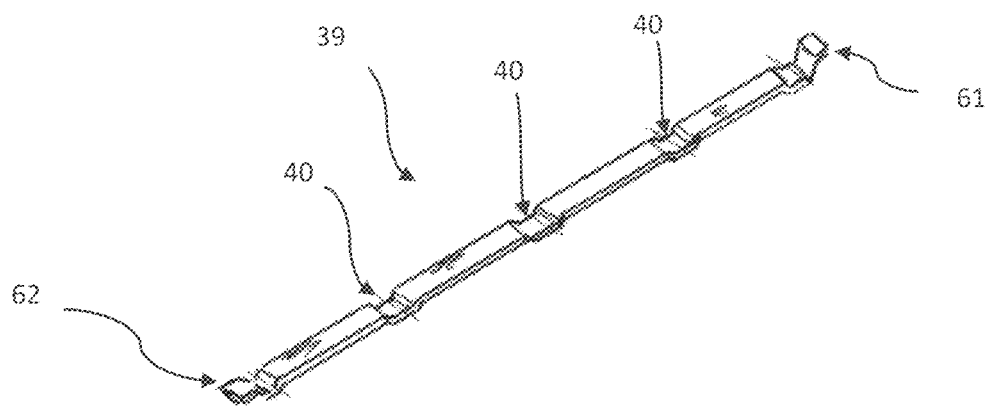
FIG. 6 is a schematic representation of a horizontal brace of the module in accordance with a preferred embodiment of the present invention.

In the FIGS. 4 and 5 (see particularly FIG. 5) the module further includes an elongate base tray receiving member 19 having a body 20 with attachment flanges 21 and 21a at either end of the body, received in a mounting condition within recess 111 of side portions 5 and 5a of the frame assembly.

The elongate base tray receiving member 19 further comprises a series of spaced apart mounting attachments 24 on the body extending away from the body towards the bottom end 4. The mounting attachments are shown as a pair of spaced tabs 25 and a recess 26 therebetween extending rearwardly of the body towards the bottom frame end 4. As best shown in FIG. 4, in an assembled condition the spaced tabs 25 of the mounting attachment 24 are received within recess 111 of bottom frame end 4, and the mounting attachment and bottom frame end cooperate to form an internal well 27 for collection of condensate from internal condensate streams 28, 29 and 30, on the inner surface 16 of the upper solar energy transmission wall 15, on the inner surface 18 of the lower solar energy transmission wall 17, and the lower surface 78 of the base tray 11 respectively. The body 20 of the base tray receiving member further includes a series of spaced apart protrusions or ridges 42 on the upper surface thereof coextending with the mounting attachments for engaging longitudinal spacer members 41.

As shown in FIGS. 4 and 5, the elongate base tray receiving member 19 comprises an internal trough 31 within the body 20. The internal trough 31 is defined by an elongate mouth 32 opening into a floor portion 33, a ceiling portion 34, and a rear throat 35. The internal trough is substantially u-shaped and faces away from the bottom end 4 towards the top end 3 of the frame assembly.

As shown in FIG. 4, the mouth 32 receives a bottom end portion of the base tray and the porous material sheet therethrough. In this embodiment, the lower surface of the base tray is bonded to the floor of the internal trough by an adhesive 79, and excess treatment fluid shown as 37 is collected by the internal trough and the liquid is prevented from displacement upwards between the floor and base tray. The throat 35 includes an outlet 38 therein for egress of the collected treatment liquid from the internal trough from the module without cross-contamination of the condensate streams 28, 29 and 30.

Referring to FIGS. 1, 5, 6 and 7, the module further includes a series of spaced apart horizontally extending braces 39. The braces are fitted at their respective ends 61 and 62 to recesses in opposite side portions 5 and 5a of the frame assembly to retain them in position over and against the porous sheet material 13. In this condition the horizontal braces maintain the porous material sheet in a static position on the base tray and inner plastic sheet. The braces 39 include a series of spaced apart recesses 40 for receiving a longitudinal spacer member 41. In one embodiment in FIG. 4, the module includes a further stiffening brace 90 extending beneath and across the base tray mounted to opposite sides of the frame assembly.

Figure 7:
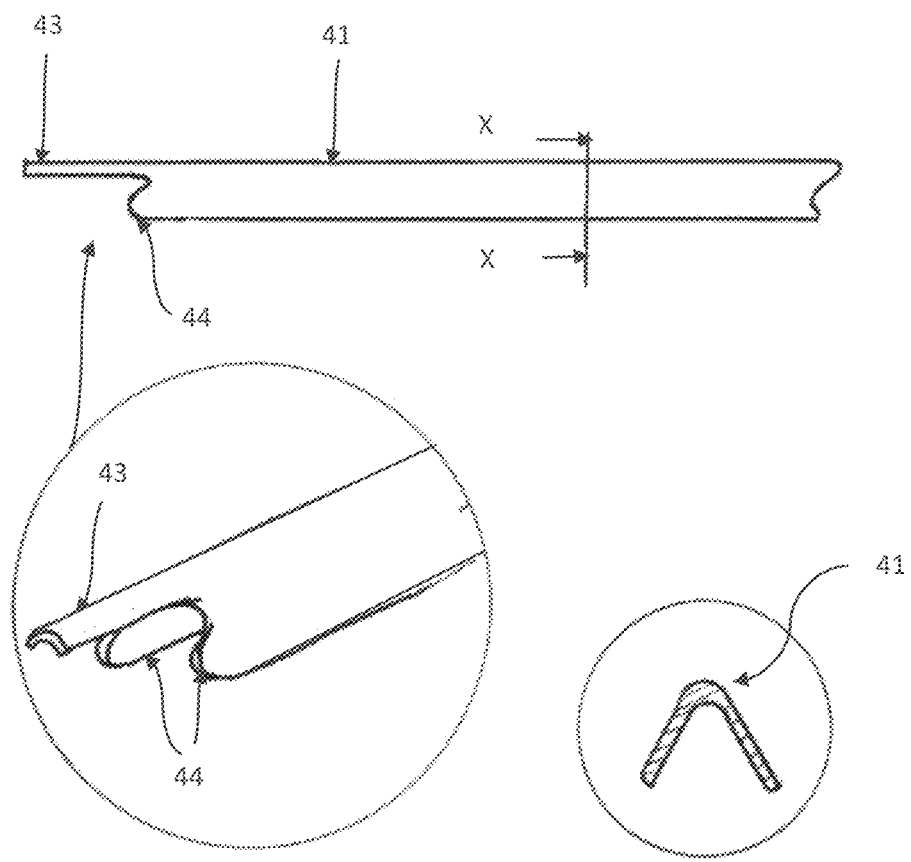
FIG. 7 is a schematic representation and close up cross-section of a longitudinal extending rib of the module in accordance with a preferred embodiment of the present invention.

As shown in FIGS. 5 and 7, the module includes a series of longitudinal spacer members 41 extending between the top end and bottom end of the frame assembly. The longitudinal spacer members have an inverted v-shape geometry in vertical cross-section forming ribs slotting into the spaced recesses 40 of the horizontal braces 39. The inverted v-shaped ribs support the upper solar energy transmission wall in a spaced location to the porous material sheet. In this embodiment the spacing between the upper plastic sheet and porous material layer is between about 10 to 40 mm.

The longitudinal ribs 41 and the body 20 of the tray receiving member include mating engagement components. As shown in FIGS. 5 and 7, the mating engagement components include a central prong 43 on an end portion of a longitudinal rib 41, and a complementary ridge portion 42 on a top surface of the body co-extending with and oppositely to the mounting attachment(s) 24.

As shown in FIG. 7, the longitudinal ribs further include a central prong 43 overhanging a pair of offset insert spacers 44 at a bottom end portion thereof. In assembly the central prong releasably engages with the ridge portion on the body of the base tray receiving member, and the pair of the offset insert spacers 44 slot within the mouth 32 of the internal trough engaging with the floor and ceiling thereof. Alternatively, as shown in FIG. 4, the internal trough of the base tray receiving member further includes a series of internal teeth 91 adapted to assist the maintenance of the mouth of the internal trough in an open condition at a predetermined width, contact with the elongate base tray, porous material sheet and plastic inner sheet, and in the reduction of blockages from the input treatment water which could cause cross-contamination or reduce output.

The bottom end 4 of the frame assembly 2 includes a condensate outlet 45 located in a bottom side end portion of the frame assembly in communication with the well 27, whereby the orientation of the frame assembly to the horizontal and vertical allows collection of the condensate streams in the well separate from the treatment liquid, and egress of the condensate from the well 27 for collection.

Figure 8:
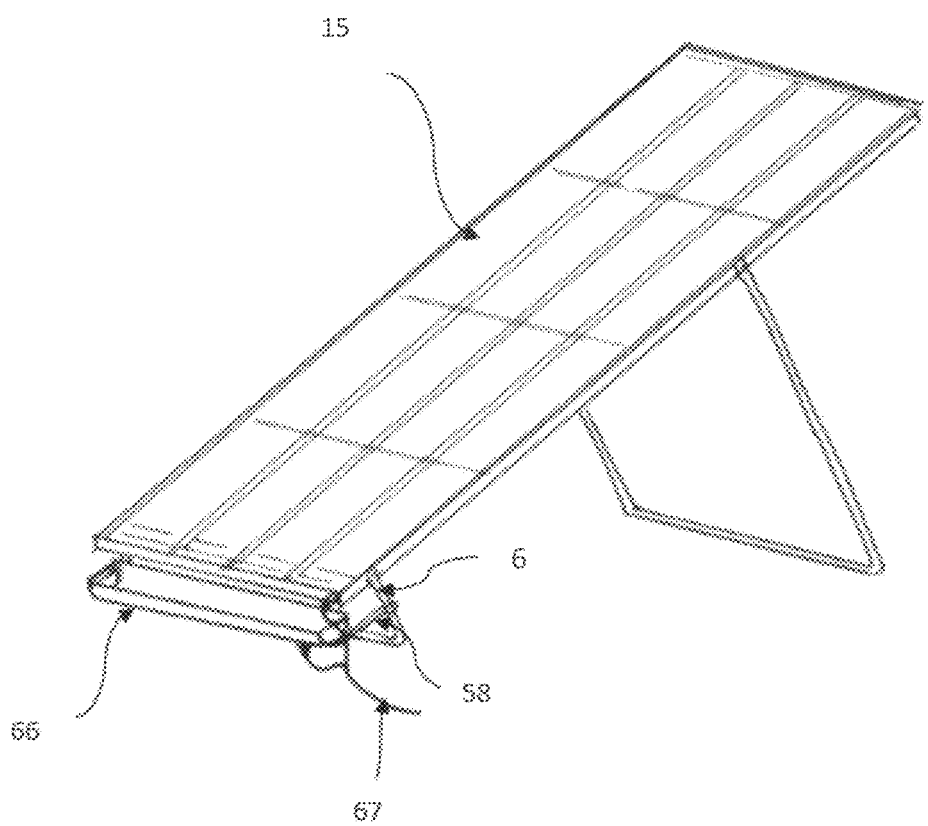
FIG. 8 is a schematic representation in part side elevation of an improved solar still module including a rain water gutter in accordance with a preferred embodiment of the present invention.
Figure 9:
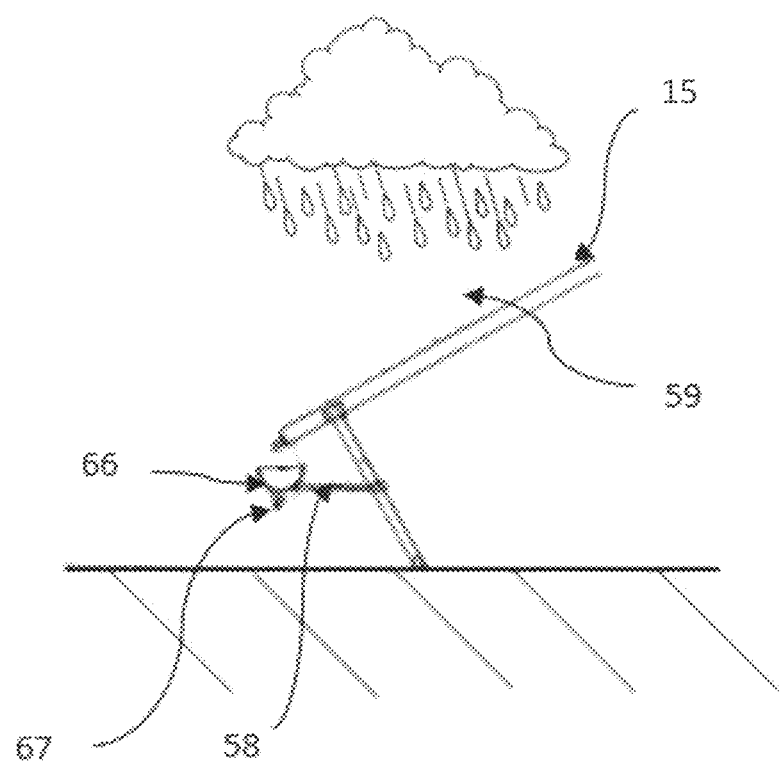
FIG. 9 is a schematic representation from one side of the preferred embodiment of the present invention in FIG. 8.

Referring to FIGS. 8 and 9, there is shown a further embodiment in which a distillation module in accordance with the invention further include a rain collection gutter 66 mounted adjacent the bottom end of the frame assembly by support 58 connected to legs 6. In this embodiment, rain 59 contacting the external surface of the upper solar energy transmission wall 15 can run downwardly on the outside of the module to be collected by the gutter. The gutter includes an outlet and in this embodiment the outlet can be connected in series to an adjacent module by a conduit 67. In a further related embodiment, the invention includes a plurality of solar still modules connected in series with a continuous elongated gutter serving multiple solar still modules.

In operation of the solar distillation unit treatment input liquid is fed into the module and the liquid disperses over the base tray by the porous material, and as solar energy passes through the upper solar energy transmission wall, the input liquid evaporates off the porous material and condenses on a plurality of surfaces including inner surface of the upper transmission wall, inner surface of lower transmission wall, and underneath surface of the base tray. The internal trough receives any excess input fluid that remains on the cloth and this is directed outside the module via an outlet in a throat portion of the internal trough. The plurality of condensate streams flows from the condensate surfaces into a well formed by cooperating mounting attachments on the base tray receiving member and recesses in the bottom end of the frame. An outlet in the bottom end of the frame communicating with the well allows egress of condensate separate from the input treatment fluid.

Figure 10:
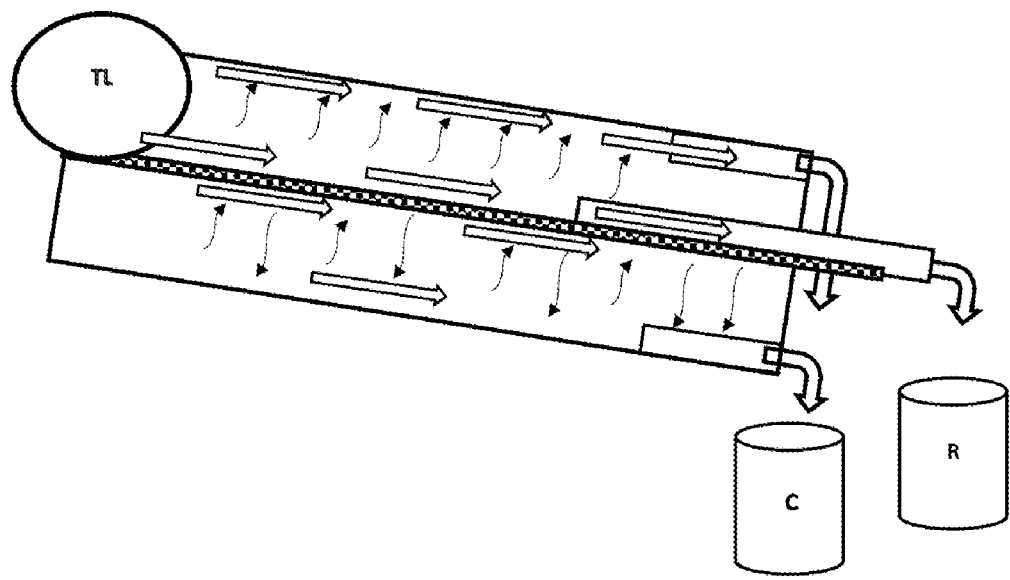
FIG. 10 is a schematic representation in horizontal cross-section showing a system for substantially minimizing cross-contamination of condensate streams with input treatment liquid in accordance with the present invention.
Figure 11:
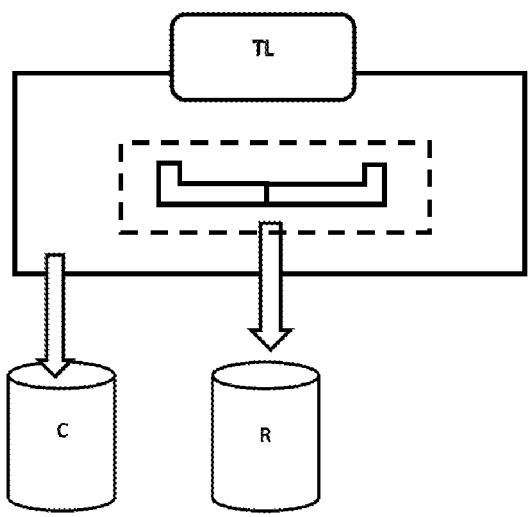
FIG. 11 is a schematic representation in vertical cross-section of FIG. 10, showing a system for substantially minimizing cross-contamination of condensate streams with input treatment liquid in accordance with the present invention.

Referring to FIGS. 10 and 11 there is shown the general concept of a flow through system according to the present invention which provides a practical solar still module effectively minimising the prospect of cross-contamination of an input treatment liquid such as sea water and a plurality of condensate streams. FIGS. 10 and 11 show figuratively a flow of solar water distillation system comprising a flow system for collecting (C) one or more condensate streams from an input treatment liquid (TL); and an input treatment liquid separator within the flow system adapted to collect excess (R) input treatment liquid from the flow system separate from the one or more condensate streams, wherein the treatment liquid is maintained separate to the condensate streams to substantially minimise cross-contamination of the one or more condensate Benefits of the system include:

Solar distillation within a solar water distillation unit provides for the distinct separation from the liquid supply stream and the condensate (distilled water). The process applied within the solar distillation unit provides for the input water to be separated into two distinct output streams (distilled water) and non-distilled water. To achieve the aim of producing distilled water these separate streams must be separated within the solar distillation unit. This module of the invention reduces the possibility of contamination of the distilled water produced and increases the distillation efficiency by ensuring the internal separation of the input water and the distilled water;

The use of cross-brace structure and interconnecting longitudinal ribs, provides structural strength, retains the porous material in a static position, i.e., prevent it from lifting from the tray, while maintaining the mouth of the internal trough in an open condition at a predetermined width.

The base tray is less prone to corrosion hence greater life expectancy of the module The module can be readily disassembled for maintenance Interpretation Embodiments Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to a solar still module for use in water industry, solar industry, waste management industry and manufacturing industries.

The invention claimed is:

1. A solar water distillation module substantially minimising cross-contamination of an input stream of a treatment liquid and a plurality of condensate streams, including:
an elongate planar frame assembly defining a perimeter having a top end and a bottom end and side portions, and leg supports supporting the planar frame assembly at an angle to the horizontal defining a top end and a bottom end thereof, and at an angle to the vertical;
a disbursement header mounted to the planar frame assembly located close to the top end, the disbursement header having a reservoir for receiving the treatment liquid from a treatment liquid source;
an elongate base tray mounted to the planar frame assembly having a planar upper surface and an opposite facing surface, wherein the upper surface is heat conductive and adapted to reflect solar energy;
a porous material sheet overlaying the planar upper surface of the base tray, wherein a top end portion of the porous material sheet is in fluid communication with the reservoir of the disbursement header, and wherein the porous material sheet is adapted to draw liquid from the reservoir of treatment liquid and distribute the treatment liquid over the area defined by the upper surface of the elongate base tray;
an upper solar energy transmission wall attached to the planar frame assembly extending over and spaced from the upper surface of the elongate base tray, the upper solar energy transmission wall formed of substantially clear or translucent plastic material having an inner condensate surface being hydrophilic relative to the condensate, whereby the inner surface provides a pathway for a first condensate stream of the plurality of condensate streams;
a lower solar energy transmission wall attached to the planar frame assembly extending over and spaced from the opposite facing surface of the elongate base tray, the lower solar energy transmission wall having an inner condensate surface, whereby the inner surface of the lower solar energy transmission wall provides a pathway for a second condensate stream of the plurality of condensate streams;
a base tray receiving member having:
a body adapted to be mounted at or close to the bottom end of the planar frame assembly extending between the side portions of the planar frame assembly;
a plurality of spaced apart mounting attachments on the body adapted to be mounted by a mounting portion on the planar frame assembly adjacent the bottom end;
an internal trough within the body having a ceiling, an opposite floor, a throat, and a mouth, the internal trough facing away from at least one of the plurality of spaced apart mounting attachments, wherein the mouth receives a bottom end portion of the elongate base tray and the porous material sheet therethrough in an assembled condition, wherein excess treatment liquid expelled from the bottom end of the porous material sheet is received by the internal trough; and
an outlet in the throat for directing expelled treatment fluid collected in the internal trough out of the module, wherein in an assembled condition, the outlet extends through a bottom end portion of the planar frame assembly for egress of excess treatment liquid separate from the condensate streams of the plurality of condensate streams;
wherein the plurality of spaced apart mounting attachments of the base tray receiving member and the bottom end of the planar frame assembly cooperate to form a well separate from and offset to the internal trough to collect condensate from the plurality of condensation streams substantially without cross-contamination with the treatment liquid;
a series of spaced apart horizontally extending braces fitted at their ends to the planar frame assembly side portions and positioned over and against the porous material sheet to substantially maintain the porous material sheet in a static position relative to the elongate base tray, wherein the horizontally extending braces further include a series of spaced apart recesses, a series of spaced apart longitudinal spacer members extending between the top end and the bottom end of the planar frame assembly, wherein longitudinal spacer members having a substantially inverted v-shape forming a series of longitudinal ribs slotting into the spaced recesses of the horizontally extending braces to support the upper solar energy transmission wall in a spaced relation to the elongate base tray;

wherein the longitudinal spacer members and the base tray receiving member include mating engagement components so that end portions of the longitudinal spacer members releasably engage a portion of the base tray receiving member to support the base tray receiving member, wherein the mating engagement components include:

a prong structure on the bottom end of each of the longitudinal spacer members comprising an arcuate overhang portion and a pair of oppositely disposed and spaced inserts; and a series of spaced apart complementary ridges on an upper facing surface of the base tray receiving member;

wherein in an assembled condition the overhang of the prong structure engages with one of the series of spaced apart complementary shaped ridges on the upper facing surface of the base tray receiving member, and wherein the pair of oppositely disposed and spaced inserts are sized to be received within the internal trough through the mouth to maintain the mouth in an open condition; and wherein the planar frame assembly includes a condensate outlet located in a bottom end portion thereof in communication with the well, whereby the orientation of the planar frame assembly directs a flow of condensate in the well to the condensate outlet for collection separate from the treatment liquid.

2. The solar water distillation module according to claim 1, further comprising an inner plastic sheet covering at least a portion of the upper surface of the elongate base tray and sandwiched between the elongate base tray and the porous material sheet.

3. The solar water distillation module according to claim 1, wherein the longitudinal spacer members support the upper solar energy transmission wall at a distance of between about 10 to 40 mm from the elongate base tray and porous material layer.

4. The solar water distillation module according to claim 1, plurality of spaced apart the base tray receiving member includes mounting flanges extending therefrom for locating the base tray receiving member close to the bottom end of the planar frame assembly.

5. The solar water distillation module according to claim 4, wherein the mounting flanges include a recess therebetween such that in a mounted position with the bottom end of the planar frame assembly, a well is formed away from the trough for receiving the plurality of condensate streams substantially without cross-contamination with the treatment liquid.

6. The solar water distillation module according to claim 5, wherein the mating engagement components allow releasable engagement of the plurality of mounting attachments by the bottom end of the planar frame assembly.

7. The solar water distillation module according to claim 1, wherein the bottom end of the planar frame assembly includes a recess for receiving a mounting flange element of each of the plurality of mounting attachments of the base tray receiving member.

8. The solar water distillation module according to claim 6, wherein the mouth of the internal trough extends across the planar frame assembly, and wherein a lower end portion of the base tray received in the internal trough is attached to the opposite floor of the internal trough by means of adhesive, sealant, glue, tape or the like to substantially prevent egress of treatment liquid beneath the lower end portion of the elongate base tray.

9. The solar water distillation module according to claim 1, wherein the internal trough of the base tray receiving member further includes a series of internal teeth adapted to (i) assist in the maintenance of the mouth of the internal trough in an open condition at a predetermined width, (ii) contact the elongate base tray, porous material sheet and plastic inner sheet, and (iii) assist in the reduction of blockages from the input treatment water which could cause cross-contamination or reduce output.

10. The solar water distillation module according to claim 1, wherein the outlet is located in the planar frame assembly in accordance with the orientation of the planar frame assembly to the horizontal and vertical to promote the egress of the condensate from the outlet in the well.

11. A solar water distillation system including:

a flow system for collecting one or more condensate streams from an input treatment liquid comprising:

an elongate planar frame assembly defining a perimeter having a top end and a bottom end, and leg supports supporting the planar frame assembly at an angle to the horizontal to allow gravitational flow of input treatment liquid and the one or more condensate streams;

a disbursement header mounted to the elongate planar frame assembly located close to the top end, the disbursement header having a reservoir for receiving treatment liquid from a treatment liquid source;

an elongate base tray mounted to the planar frame assembly having a planar upper surface and an opposite facing surface, wherein the upper surface is heat conductive and adapted to reflect solar energy;

a porous material sheet overlaying the planar upper surface of the elongate base tray, wherein a portion of the porous material sheet is in fluid communication with the reservoir of the disbursement header, and wherein the porous material sheet is adapted to draw liquid from the reservoir of treatment liquid and distribute the treatment liquid over the area defined by the upper surface of the elongate base tray;

an upper solar energy transmission wall attached to the planar frame assembly extending over and spaced from the upper surface of the elongate base tray, the upper solar energy transmission wall having an inner condensate surface being hydrophilic relative to the condensate, wherein the inner surface provides a pathway for a first condensate stream; and a lower solar energy transmission wall attached to the planar frame assembly extending over and spaced from the opposite facing surface of the elongate base tray, the lower solar energy transmission wall having an inner condensate surface, wherein the inner surface of the lower solar energy transmission wall provides a pathway for a second condensate stream;

an input treatment liquid separator within the flow system adapted to collect excess input treatment liquid from the flow system separately from the one or more condensate streams, wherein the input treatment liquid separator comprises a base tray receiving member having:

a body adapted to be mounted at or close to the bottom end of the planar frame assembly extending between side portions of the planar frame assembly;

at least one mounting attachment on the body adapted to be mounted by a mounting portion on the planar frame assembly adjacent the bottom end;

an internal trough within the body receiving a bottom end portion of the elongate base tray and the porous material sheet therethrough in an assembled condition, wherein excess treatment liquid expelled from the bottom end of the porous material sheet is received by the internal trough; and an outlet in the internal trough for directing expelled treatment fluid collected in the internal trough out of the module, separate from the one or more condensate streams;

wherein the at least one mounting attachments of the base tray receiving member and the planar frame assembly cooperate to form a well separate from and offset to the internal trough to collect condensate from the one or more condensation streams substantially without cross-contamination with the treatment liquid; and wherein the planar frame assembly includes a condensate outlet located in a bottom end portion thereof in communication with the well, whereby the orientation of the planar frame assembly directs a flow of condensate in the well to the condensate outlet for collection separate from the treatment liquid; and wherein a separation is maintained between the treatment liquid and the condensate streams.

* * * * *